No. 632,488. Patented Sept. 5, 1899.
J. M. HANSON & W. STEWART.
ACETYLENE GAS GENERATOR.
(Application filed June 21, 1898.)
(No Model.) 4 Sheets—Sheet 1.
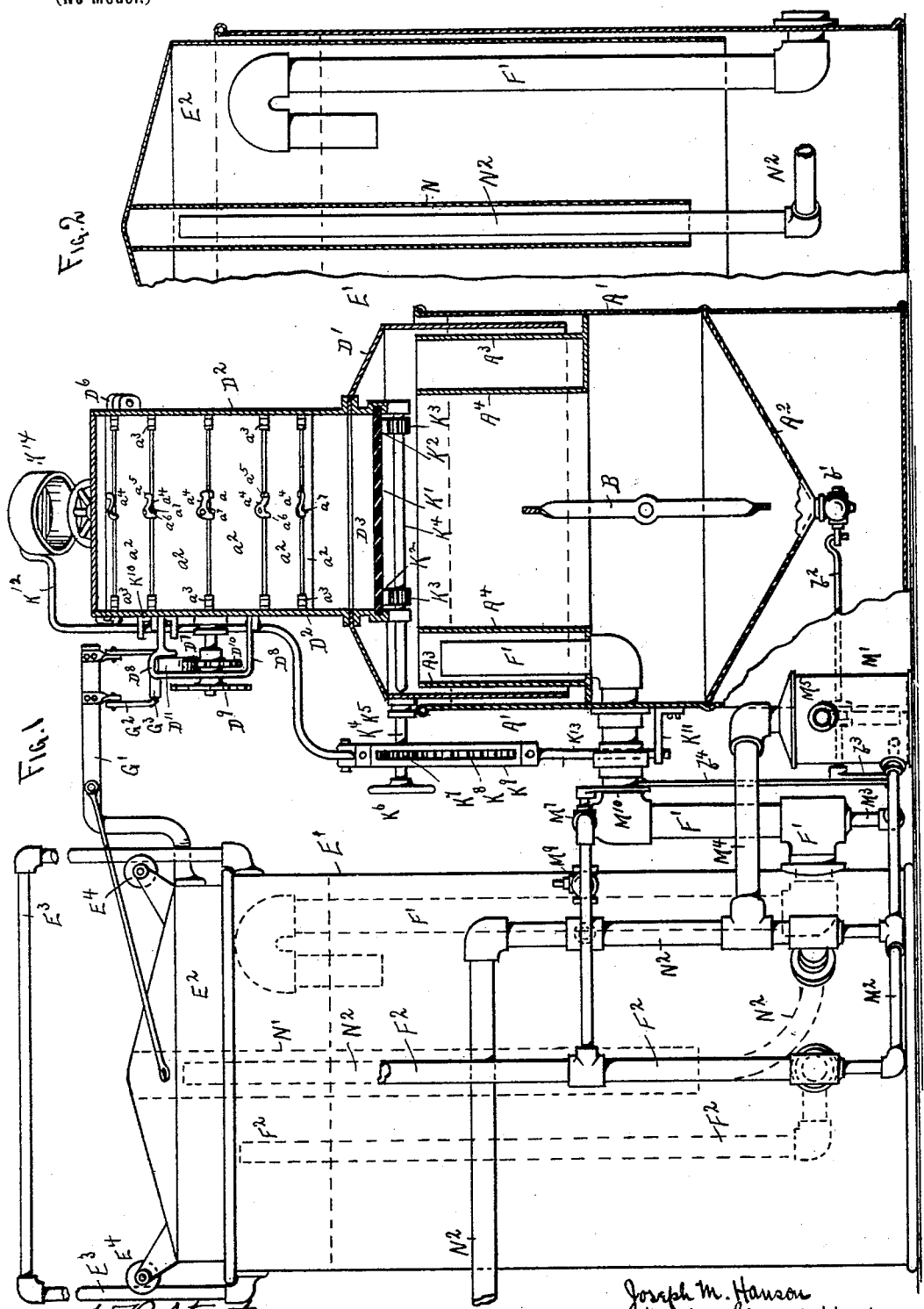

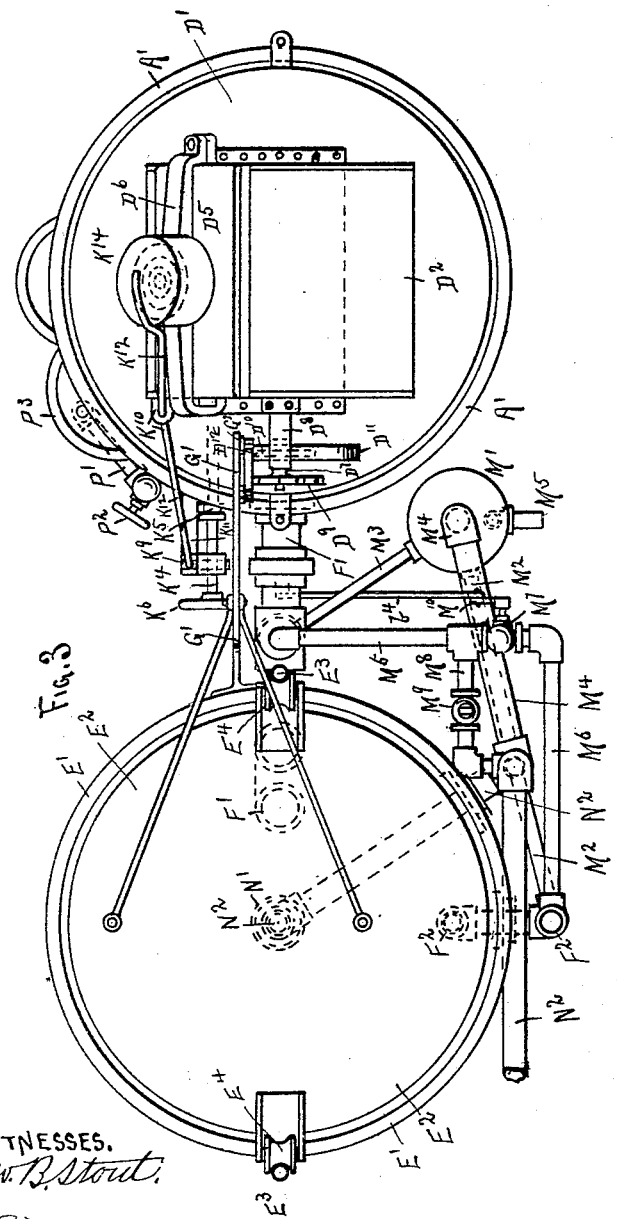

No. 632,488. Patented Sept. 5, 1899.
J. M. HANSON & W. STEWART.
ACETYLENE GAS GENERATOR.
(Application filed June 21, 1898.)
(No Model.) 4 Sheets—Sheet 3.
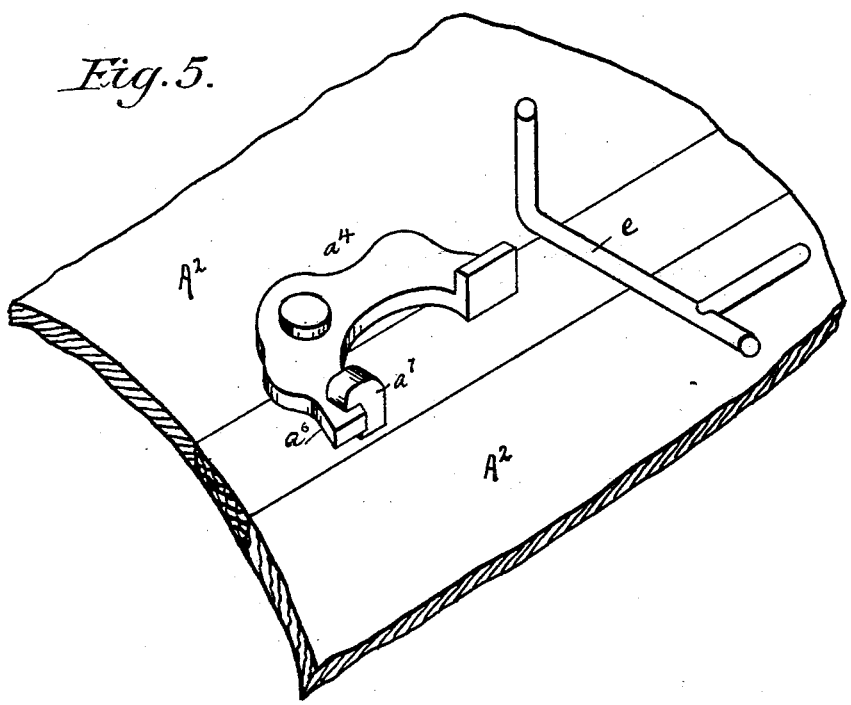
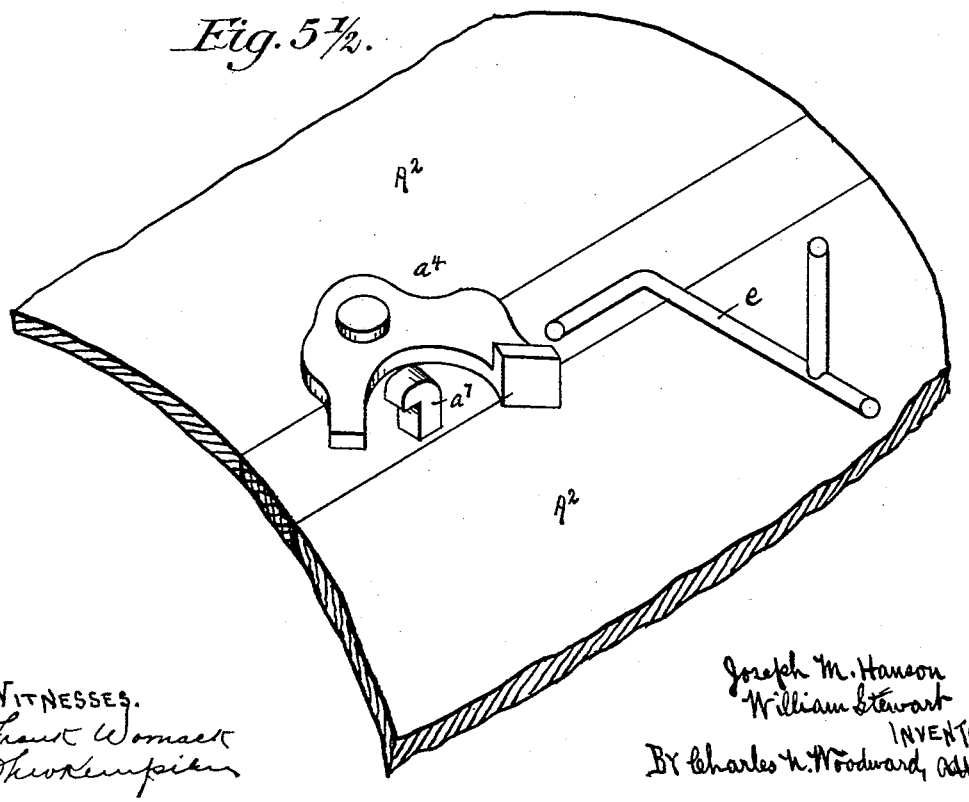

No. 632,488. Patented Sept. 5, 1899.
J. M. HANSON & W. STEWART.
ACETYLENE GAS GENERATOR.
(Application filed June 21, 1898.)
(No Model.) 4 Sheets—Sheet 4.
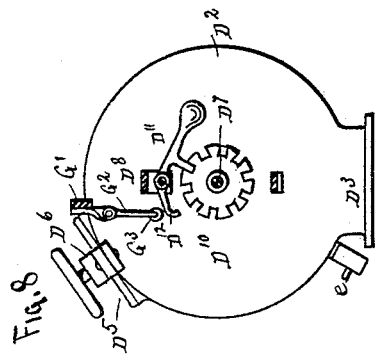
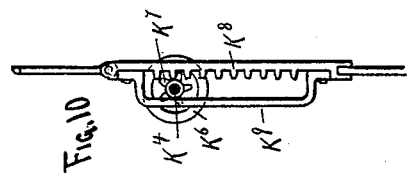
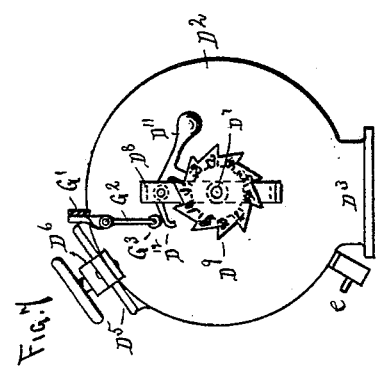
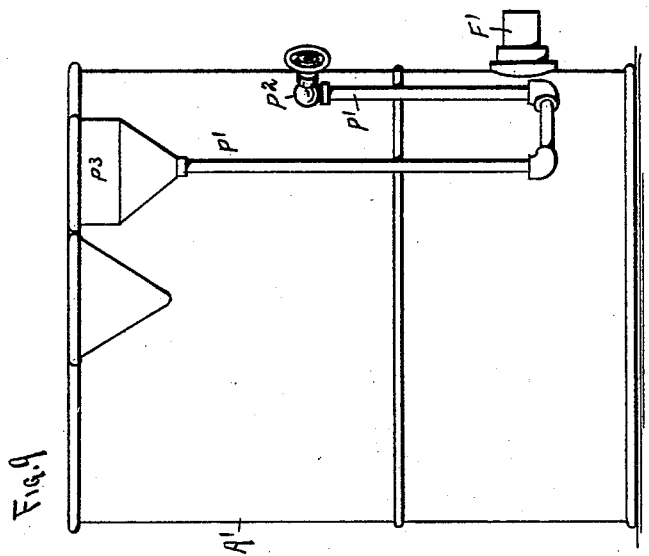
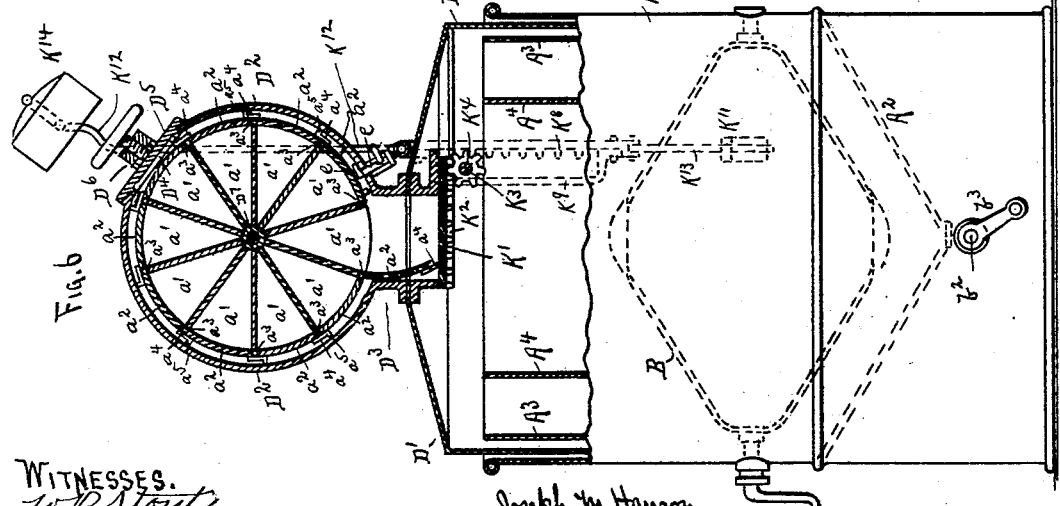
WITNESSES.
W. B. Stout
F. Nomack
Joseph M. Hanson
William Stewart INVENTORS. BY Charles N. Woodward

UNITED STATES PATENT OFFICE.

JOSEPH M. HANSON AND WILLIAM STEWART, OF ST. PAUL, MINNESOTA, ASSIGNORS TO THE ACETYLENE GAS APPARATUS COMPANY, OF SAME PLACE.

ACETYLENE-GAS GENERATOR.

SPECIFICATION forming part of Letters Patent No. 632,488, dated September 5, 1899.

Application filed June 21, 1898. Serial No. 684,110. (No model.)

*To all whom it may concern:*

Be it known that we, JOSEPH M. HANSON and WILLIAM STEWART, citizens of the United States, residing at St. Paul, in the county of Ramsey and State of Minnesota, have invented certain new and useful Improvements in Acetylene-Gas Apparatus, of which the following is a specification.

This invention relates to apparatus for the generation of gas, more particularly acetylene gas; and it consists in the construction, combination, and arrangement of parts, as hereinafter shown and described, and specifically pointed out in the claims.

The apparatus is designed to be used to generate gas by the chemical coaction of two bodies, one a solid and the other a liquid.

In the drawings is shown in Figure 1 a semisectional side elevation of the apparatus complete. Fig. 2 is a sectional detail of a portion of a gasometer, illustrating the interior construction. Fig. 3 is a plan view of the parts shown in Fig. 1; Fig. 4, a detached sectional detail of the trap for receiving and discharging the overflow and drip from the generator and gasometer. Fig. 5 is a perspective view of portions of an adjacent pair of the doors of the feed-cylinder pockets with one of the locking-catches and its operating mechanism, showing the catch closed; and Fig. 5½ is a similar view showing the catch open or disengaged. Fig. 6 is a semisectional side elevation of the generating part of the apparatus. Fig. 7 is a side view of the feed-drum, and Fig. 8 is a side view of the feed-drum with the ratchet for actuating the feed-drum removed. Fig. 9 is a side view of the shell of the generator part of the apparatus, illustrating the construction of the water-supply mechanism. Fig. 10 is a detached detail of the mechanism for operating the lock for the feed-cylinder cover.

The generating part of the apparatus consists of a "shell" or casing $A'$, having a hopper-bottom $A^2$ and discharge $b'$, and also provided with a mechanical "stirrer" or "agitator" $B$ in the bottom of the shell $A'$, so that the sediment or "ashes" resulting from the generation may be stirred up when required to be removed and prevented from settling into the bottom of the casing and clogging the discharge. The agitator $B$, it will be observed, is in the lower part of the casing $A'$ and will not seriously disturb the water in the upper part of the generator-chamber and interfere with the generation of the gas. The discharge $b'$ may be conducted into a sewer or other locality or into a receptacle. Within the shell $A'$ an annular partition $A^3$ is arranged to provide a receptacle for water to form the "seal" for the "bell" $D'$, as shown.

$A^4$ is a shell inside the water seal $A^3$, forming a space in which the gas may gather as fast as it is generated, as hereinafter explained.

Upon the bell $D'$ is supported a circular drum $D^2$, connected to the interior of the bell by a contracted throat $D^3$ and having a sliding air-tight valve $K'$, whereby all communication between the bell and drum may be shut off when required. Within the drum $D^2$ is mounted a reel divided into a series of radiating uniform compartments $a'$, as shown in Fig. 6, to hold the compound from which the gas is to be generated. The throat portion $D^3$ of the drum corresponds at its upper end to one of the compartments $a'$, so that as the drum is revolved the compartments pass consecutively over the "throat" portion $D^3$ and discharge their contents into the receptacle $A'$, as hereinafter shown. In the upper part of the drum $D^2$ is a feed-opening $D^4$, having a cover $D^5$, secured removably in place by a yoke $D^6$, and through which feed-opening the compartments $a'$ may be supplied with the compound from which the gas is to be generated.

Each of the compartments $a'$ will be provided with a cover or door $a^2$, hinged at $a^3$ to one side of each compartment and retained in place by a catch $a^4$, engaging with a pin or hook $a^7$ on the division-wall of the next of the compartment, as shown in Figs. 1 and 6. $e$ is a trip-bolt adapted to engage the catches $a^4$ one after the other as the drum revolves and release the covers $a^2$ as they pass over the throat portion $D^3$, and thus permit the contents of the compartments to be discharged. The construction of these trip-catches $a^4$ and the trip-bolt $e$, by which they are actuated, is more clearly shown in Figs. 5 and 5½.

Each of the trip-catches $a^4$ has an outwardly-turned end $a^5$ projecting into the path of the inner end of the trip-bolt $e$ when the latter is turned in one direction, but which will pass the trip-bolt when the position of the bolt is reversed or set, as shown in Fig. 5. The short end $a^6$ of each of the trip-catches $a^4$ is adapted to hook around a pin $a^7$ on the "reel" of the feed-cylinder, and thus hold the doors intact so long as they are not released by the trip-bolt, as shown in Fig. $5\tfrac{1}{2}$. Thus when the compartments $a'$ are being filled through the feed-opening $D^4$ the trip-bolt $e$ will be reversed or set, as shown in Fig. 5, so that the trip-catches will not be acted on by its inner end to prematurely discharge the compartments. When the compartments are all filled with the compound, the trip-bolt is set, as in Fig. $5\tfrac{1}{2}$, so that thereafter as the reel is revolved the doors $a^2$ are released one after the other and the contents of the compartments discharged one after the other, as hereinafter more fully explained. The bolt $e$ is supported, as shown in Figs. 6, 7, and 8, in a hanger outside the shell $D^2$, so that it can be actuated from outside the shell.

The shaft $D^7$ of the reel of compartments $a'$ is extended and supported by a standard $D^8$ from the drum $D^2$ and provided on its outer end with a toothed wheel $D^9$, the teeth of this wheel corresponding in number and location to the compartments $a'$, as shown, and having numbers thereon in regular order, as shown. As many of the compartments $a'$ may be employed as may be desired, but for the purpose of illustration we have shown ten in the drawings; but a greater or less number may be employed as the capacity required may render necessary.

Attached to the same shaft $D^7$ is a notched disk $D^{10}$, with which a pawl engages by its long arm $D^{11}$, while the short arm $D^{12}$ of the pawl extends across the path of the teeth of the ratchet-wheel $D^9$, as shown in Figs. 1 and 4, the object to be hereinafter shown.

The gas receiving and storing part of the apparatus consists of a gasometer $E'$ $E^2$, the bell portion $E^2$ adapted to move up and down between guides $E^3$ and sheaves $E^4$. The gas is conducted from the generator part to the receiving and storing part by piping $F'$, while the gas will be conducted away to the burners by piping $F^2$, as shown.

Attached to the top of the bell $E^2$ is a hanger $G'$, having a trip $G^2$ hanging loosely therefrom above the ratchet-wheel $D^9$ and long arm $D''$ of the lock-lever, so that as the bell $E^2$ moves downward the lower end of the trip $G^2$ will first strike the part $D^{12}$ and throw that end downward and throw the end $D^{11}$ out of its recess in the disk $D^{10}$ and release the shaft $D^7$ and act upon the ratchet-wheel $D^9$ and revolve it and the reel in the drum $D^2$ the distance of one of the compartments $a'$, the bolt $e$ at the same time releasing the catch $a^4$ and permitting the door $a^2$ to fall into the throat $D^3$, and thus discharge the contents of the lowermost compartment $a'$. The hanger $G'$ is firmly connected to the bell $E^2$ and further strengthened by diagonal brace-rods, as shown in Figs. 1 and 3, so that there can be no lateral movement of the hanger upon the bell. The trip $G^2$ will be gaged as to length to act upon the parts $D^9 D^{12}$ only when the bell $E^2$ is at or near its lowermost position, so that a fresh charge of the gas-generating compound may be supplied to the water or other fluid only when the gas-supply in the receiver needs replenishing. The hanger $G^2$ will preferably be provided with an antifriction-roller $G^3$ to assist it in its action by reducing the friction.

When the reel of compartments is to be recharged with the compound, the valve $K'$ is closed to prevent the escape of the gas remaining in the bell $A^2$. The bolt $e$ is then withdrawn, so that it will not act on the catches $a^4$. The cover $D^5$ is then removed and the compartments $a'$ opened through the feed-opening $D^4$ and filled with the compound one after the other and the cover $D^5$ replaced. The reel is then set with tooth No. 1 of the ratchet-wheel $D^9$ in position to be first acted upon by the trip $G^2$. This indicates to the operator that the reel is fully charged. The bolt $e$ is then reversed, and the apparatus is ready for action after opening the valve $K'$. When the supply of gas in the gasometer has been reduced to a sufficient extent to cause the bell $E^2$ to bring the trip $G^2$ into play, the first of the compartments $a'$ will be discharged into the generating liquid in the shell $A'$ and a fresh supply of gas thereby generated, which will flow into the gasometer and elevate the bell $E^2$, again releasing the ratchet $D^9$ and pawl $D^{11} D^{12}$, permitting the end $D^{11}$ to again engage with the recessed disk $D^{10}$ and lock the reel of compartments in the drum. Then when the gas-supply again falls the contents of another of the compartments $a'$ is discharged into the generating fluid, and so on so long as any of the compound remains. By numbering the ratchet-teeth and starting with No. 1 the operator can always know how many of the compartments $a'$ contain the compound, and thus know when the reel requires recharging. As the reel is revolved the open doors $A^2$ of the lowermost compartment $a'$, passing between the side of the drum $D^2$ and the rims of the reel, are automatically closed, as will be readily understood. As the sediment or ashes accumulate in the bottom of the generator they are discharged by the outlet $b'$, being first stirred up by the agitator B, as before described.

The valve $K'$ is provided with gear-racks $K^2$, with which pinions $K^3$ on a shaft $K^4$ engage, the shaft passing out through a suitable stuffing-box $K^5$ and provided on its outer end with a wheel or handle $K^6$, by which it may be actuated. Upon the shaft $K^4$ is a pinion $K^7$, adapted to engage with a rack $K^8$ on a frame $K^9$, the latter adapted to move perpendicularly in guides $K^{10} K^{11}$ on the drum $D^2$ and shell $A'$ by rods $K^{12} K^{13}$. The upper end of the upper rod $K^{12}$ is extended over above the feed-opening of the drum D² and is provided with a hood or cover K¹⁴, adapted to fit down over the screw-wheel of the yoke D⁶ when the shaft K⁴ is turned to open the valve K', so that the closure to the cover cannot be opened while the valve K' is open. By this means an automatic safety device is provided which will effectually prevent both the valve K' and cover D⁵ being opened at the same time.

Depending from the top of the hood of the bell E² of the gasometer is a pipe N' and fitting over a smaller pipe N², rising from the shell E' of the gasometer, as shown. This smaller pipe N² extends upward above the water-line in the gasometer and leads out through the side of the shell and is carried thence out of doors by any suitable conductor. This forms a complete safety-escape for the gas if for any cause the gasometer should become charged to an extent sufficient to raise the outer pipe N' above the water-line in the gasometer. The lower end of the pipe N' may be lengthened or shortened to adjust the "escape" so as to cause it to become effective under a decreased or increased quantity of gas in the gasometer.

M' is a small "trap-tank," into the lower part of which drip-pipes M² M³ lead from the several pipes F' F² N² to dispose of the drainage, and from the top of this tank a pipe M⁴ leads into the vent-pipe N², so that any gas rising in the tank will be disposed of.

M⁵ is the outlet to the tank M', which leads from inside the tank near the bottom out through the tank near the top, the lowermost part of this outlet being on a line with the lowermost part of the pipes F' F² N² to prevent any "siphonage" action.

M⁶ is a branch pipe connecting the outlet or service pipe F² to the piping F', by which the gas is carried from the generator to the gasometer, and with a shut-off valve M⁷ therein, as shown, to form a passage for the gas directly from the outlet F' into the service-pipe F². A "by-pass" pipe M⁸ also leads from the branch pipe M⁶ to the escape or vent N², this latter pipe also having a stop-valve M⁹, as shown.

The discharge-valve $b'$ has an operating-rod $b^2$ leading out through the shell A' of the generator and provided with an arm $b^3$ outside the shell and connected by a rod $b^4$ to an arm M¹⁰ on the valve M⁷, so that the two valves $b'$ M⁷ will be actuated in unison. By this means when the valve $b'$ is opened to discharge the residuum from the generator the valve M⁷ will likewise be opened to allow the gas-pressure in the gasometer and service-piping to flow back to the generator and equalize the pressure and prevent siphonage.

Another function of the branches M⁶ M⁸ is to provide for the discharge of the air in the generator and gasometer and service-piping when first starting the machine.

In starting the machine the rod $b^4$ is detached and both the valves M⁷ M⁹ opened, so that when gas is generated the pressure drives the air before it out through the waste-pipe N² and leaves none in the generator or gasometer to become mingled with the gas. As a measure of precaution the valves M⁷ M⁹ should be left open until one or two pocketfuls of the compound has been generated and permitted to escape, so as to be sure that all of the air has been driven out and nothing but the gas remains in the generator, gasometer, or service-piping.

P' is a pipe leading into the generator-shell, preferably below the lower line of the partitions A³ A⁴, through which the generator will be charged with the liquid and will be provided with a shut-off valve P². The pipe P' leads downward to a point near the bottom of the generator, and thence upward, and ends in a funnel P³, through which the liquid will be poured. By arranging the pipe P' with the downward bend a "trap" is formed to prevent the escape of gas from the generator when the latter is being recharged with the liquid.

The space between the partitions A³ A⁴ is entirely surrounded by the water in the generator and in the seal, (the water-line in both the generator and the gasometer being indicated by the dotted lines,) which serves to cool the gas which settles into the space formed by the partition A⁴ before it passes to the gasometer. The gas by being forced down into the water in the gasometer is thereby "washed" and at the same time still further cooled.

Having thus described our invention, what we claim as new is—

1. In an acetylene-gas generator, a shell or casing for the liquid compound, a drum upon said shell or casing and opening into said shell, a reel of radiating compartments mounted to revolve in said drum, each of said compartments having a hinged cover, a lever-catch pivoted to each of said covers, pins having lips and projecting from the division-walls between the said compartments and adapted to engage said lever-catches and hold said doors closed, a trip-bolt supported in said shell or casing and having an arm projecting into the paths of said lever-catches when set in one position, and capable of being removed from the paths of said lever-catches when set in its reverse position, substantially as and for the purpose set forth.

2. In an acetylene-gas generator, a shell or casing for the liquid compound, a drum upon said shell or casing and opening into said shell or casing, a reel of radiating compartments mounted to revolve in said drum, a valve closing the opening between said drum and shell or casing, and provided with one or more gear-racks, a shaft carrying pinions adapted to engage said gear-racks, a feed-opening to said drum, an air-tight cover to said opening, a screw-bolt to close said cover, a cover to said screw-bolt, and mechanism connecting said screw-bolt cover to said pinion-shaft, whereby said screw-bolt cover is closed over said screw-bolt when said shaft is actuated to open said valve, substantially as and for the purpose set forth.

3. In an acetylene-gas generator, a generator having a residuum-discharge valve, a gasometer, conductor-piping connecting said generator and gasometer, service-piping leading from said gasometer, a branch pipe connecting said service-piping and conductor-piping and having a shut-off valve therein, means for connecting said discharge-valve and branch-pipe valve so that they will operate in unison to equalize the pressure in said generator when the residuum is removed, substantially as set forth.

4. In an acetylene-gas generator, a shell or casing for the liquid compound, a reel of radiating compartments for the solid compound adapted to discharge consecutively into said liquid compound, a shaft carrying said reel and having a ratchet-wheel with teeth corresponding to said radiating compartments, a disk having recesses corresponding to said compartments and ratchet-teeth, a locking-pawl engaging one of said recesses and with an arm projecting across the path of said ratchet-teeth, a gasometer to receive the generated gas, a trip attached to the movable part of said gasometer and adapted to engage said ratchet, and the extended arm of said pawl, substantially as set forth.

In testimony whereof we have hereunto set our hands in the presence of two subscribing witnesses.

JOSEPH M. HANSON.
WILLIAM STEWART.

In presence of—
W. B. STOUT,
C. N. WOODWARD.